UNITED STATES PATENT OFFICE.

HENRY M. JOHNSTON, OF NEW YORK, N. Y.

IMPROVEMENT IN MATERIALS FOR DISTEMPER PAINTING.

Specification forming part of Letters Patent No. 99,907, dated February 15, 1870; reissue No. 5,510, dated July 29, 1873; application filed July 21, 1873.

*To all whom it may concern:*

Be it known that I, HENRY M. JOHNSTON, of the city, county, and State of New York, have invented a new and useful Improvement in Materials for Distemper Painting, of which the following is a specification:

In the preparation of distemper colors glue is generally used for the purpose of binding the pigments. By the ordinary process of preparing the colors this substance requires long soaking before it becomes thoroughly dissolved, and it also should be well boiled in order to impart to it the quality of flowing freely when mixed with the pigments. When, likewise, by the ordinary process, a gum or paste is used as the binding material, considerable time is necessarily consumed in preparing it for incorporation with the pigments. When the binding material has been thus prepared it is mixed with the pigments required to produce the desired color, these pigments having first been thoroughly dissolved in water; afterward the color is well strained to free it from any particles of grit.

The mixing of such colors requires long experience, and the time consumed in their preparation is often greater than that required in their use, and it is very difficult to determine the requisite quantity of the various pigments required to produce the desired colors, shades, or tints, and the most experienced artists cannot always determine beforehand what will be the color of such mixed pigments when dry, as they always appear much darker when they are wet than otherwise. The usual method of testing them is to apply a portion to the surface that they are intended to cover and then allow them to dry. In most cases alterations have to be made to obtain the desired result.

It is the object of my invention to remedy this difficulty, heretofore existing in the art, by supplying the binding materials for distemper painting in a dry and pulverized condition, and in packages containing such relative proportions to the pigments that the materials will be ready for immediate use simply upon being mixed with a stated quantity of water, the admixture at the time of use being greatly facilitated by the pulverized condition of the materials and by the previous careful adjustment of the relative proportions thereof.

In carrying out my invention my preferred method is to mix the pigments and the glue or other binding substance in a wet condition, subsequently drying and pulverizing them, the following being a statement of my process more in detail.

I use any of the white pigments, dry or in pulp, and I mix them in water, either alone or with any suitable colored pigments, so as to impart various desired colors, tints, or shades to the white body; or, when strong, pure colors are required, I use any of the colored pigments, or a mixture of them without the whites, and if they are in a dry condition I prefer to grind them in water until they are smooth and as free from grit as their nature will admit of. I then add a solution of glue, gum, or paste, and thoroughly incorporate it with the mixed pigments. Any other suitable adhesive substance or substances that will impart the requisite adhesive quality to the pigments may be used in lieu of the solutions of glue, gum, or paste.

When glue is used as the binding material, and when the temperature will admit, I chill the mixture and cut it into sheets, and dry them on nets in the same manner as in the drying of glue; or, after the drying is nearly completed, the drying may be finished by artificial heat. The mixture may also be placed in shallow troughs to dry, or it may be dried in any other suitable manner.

It is desirable not to use any more water in mixing the pigments or in preparing the adhesive solutions than is necessary for the purpose, as the mixture should be as dense as possible, so as to prevent any settling or separation of the pigments while the mixture is drying.

When I mix the pigments and adhesive substance together by the above-described process, which I denominate my wet process, I sometimes use carbolic acid or camphor with the adhesive solution, so as to prevent decomposition and molding of the adhesive substance while the mixture is drying. After the mixture is dried the sheets of sized or adhesive pigments are broken into small fragments in any convenient manner and then reduced to a fine powder by grinding in a mill, or by any other suitable means. The pigments thus sized and pulverized are then put up in packages of any convenient or suitable size, and thus put upon the market.

The particular advantage of the wet process, as above described, for producing my improved materials for distemper painting consists in the fact that thereby I am able to effect the most thorough and intimate admixture of the pigments and the binding materials.

If preferred, however, the pigments and the adhesive substances may be prepared in a pulverized condition, without, as in the wet process, being first mixed with water. If the dry process be employed the pigments and the glue or its equivalent may either be mixed in the requisite proportions at the time of grinding or the binding material may be ground by itself, and subsequently mixed with the pigments, either by the manufacturer in preparing the materials for the market, or by the consumer at the time of use. If the latter plan be adopted the binding substance will, of course, be put up in a separate package from the pigments, or in a separate compartment of the same package or envelope, the two being in such relative proportions as to produce the desired effect when they are mixed.

The great merit of my invention, whether the materials be prepared by the dry or by the wet process, consists in the fact that the most delicate colors, such as are prone to change when kept in the wet state mixed with glue, can, by my mode of preparing them, be preserved indefinitely without undergoing the slightest change; and in the further fact that the materials prepared and put up in suitable packages, as above stated, are ready for immediate use, requiring no further trial or experiment to produce any color desired, as each package contains directions as to how much water, either hot or cold, as occasion may require, is to be mixed with a stated quantity of the materials; and each package also bears a number which refers to a sample card or book, containing samples corresponding in number with those on the package, which samples have been coated over with the prepared materials, and show their quality and exact color when applied and dry.

I am thus enabled to supply a want long felt by providing the community with prepared materials for distemper painting in a finely-pulverized condition and commercial form, capable of producing with exactness any desired color, tint, or shade, and only requiring to be mixed with a stated quantity of water to be ready for use in fresco or distemper painting, or in the manufacture of paper-hangings, enameled paper, and card-board, and for a great variety of other uses where such colors are required; thus enabling persons of but little skill to produce any desired color, shade, or tint with certainty and at small cost.

What I claim is—

The materials for distemper painting hereinbefore described, consisting of pulverized glue or other binding substance and pigments, prepared and put up in packages, either separately or mixed, substantially as and for the purpose set forth.

HENRY M. JOHNSTON.

Witnesses:
PHILIP M. SHUEY,
BENJ. A. SMITH.